S. K. DENNIS.
CORN PLANTER.
APPLICATION FILED APR. 8, 1911.

1,011,926.

Patented Dec. 19, 1911.

2 SHEETS—SHEET 1.

Witnesses:
C. C. Palmer.
F. W. Hoffmeister.

Inventor.
Samuel K. Dennis.
By E. W. Burgess
Attorney

S. K. DENNIS.
CORN PLANTER.
APPLICATION FILED APR. 8, 1911.
1,011,926.
Patented Dec. 19, 1911.
2 SHEETS—SHEET 2.
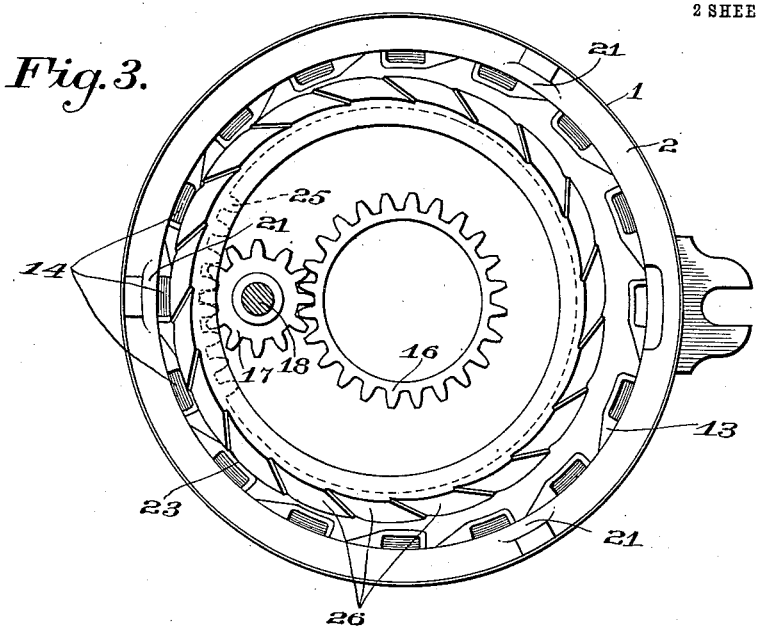
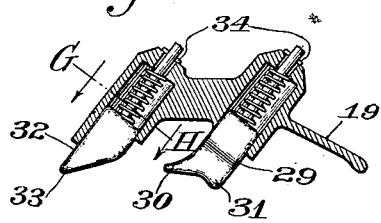
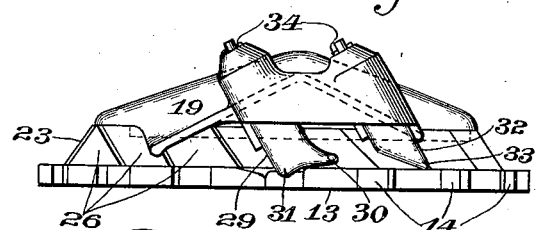
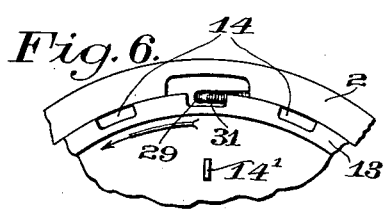
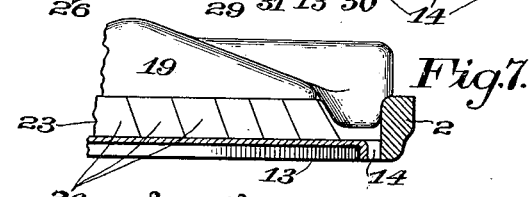
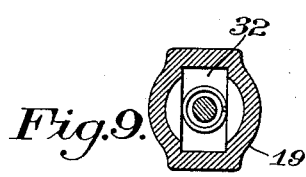
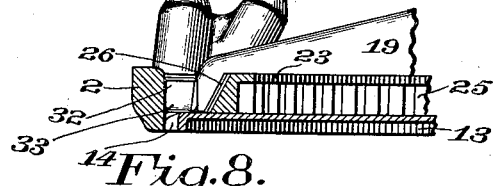
Witnesses:
C. C. Palmer
F. W. Hoffmeister
Inventor:
Samuel K. Dennis.
By E. W. Burgus
Attorney.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,011,926.  Specification of Letters Patent.  Patented Dec. 19, 1911.

Application filed April 8, 1911. Serial No. 619,642.

*To all whom it may concern:*

Be it known that I, SAMUEL K. DENNIS, a citizen of the United States, residing at Chicago, in the county of Cook and State of Illinois, have invented certain new and useful Improvements in Corn-Planters, of which the following is a specification.

My invention relates to corn planters, and in particular to the seed dropping mechanism, and consists in improved means whereby greater precision and a more positive delivery of the seed from the seed hopper to the seed conduit is attained; the object of my invention being to provide a mechanism that will insure a continuous and proper feeding of single kernels to the seed cells, prevent the mass of corn from bridging across the annular channel leading to the seed cells, and efficiently eject the kernels from the cells as they pass the opening leading to the seed conduit that delivers the seed to the furrow prepared for it. I attain this object by means of the mechanism illustrated by the accompanying drawings, in which—

Figure 1:
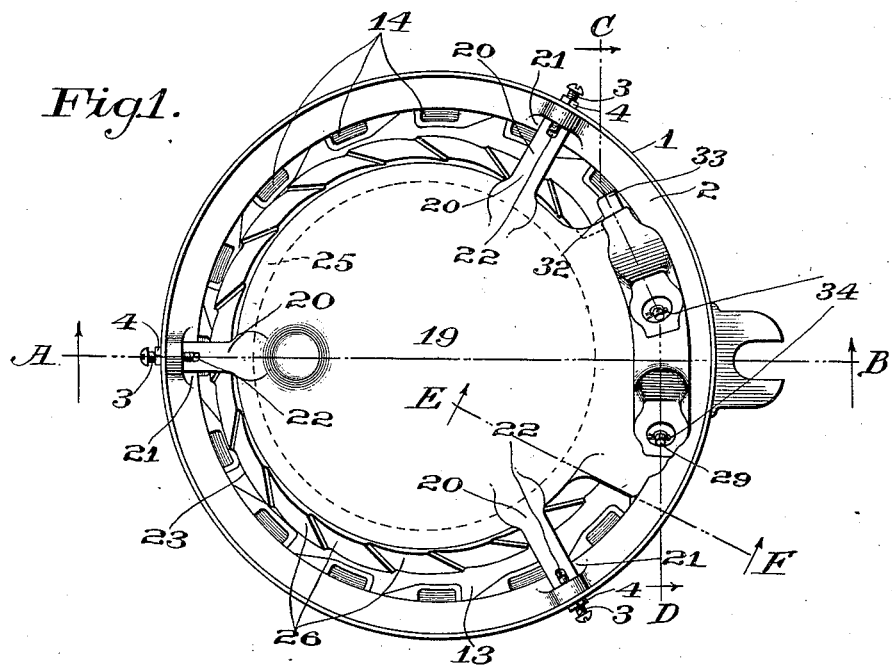
Figure 2:
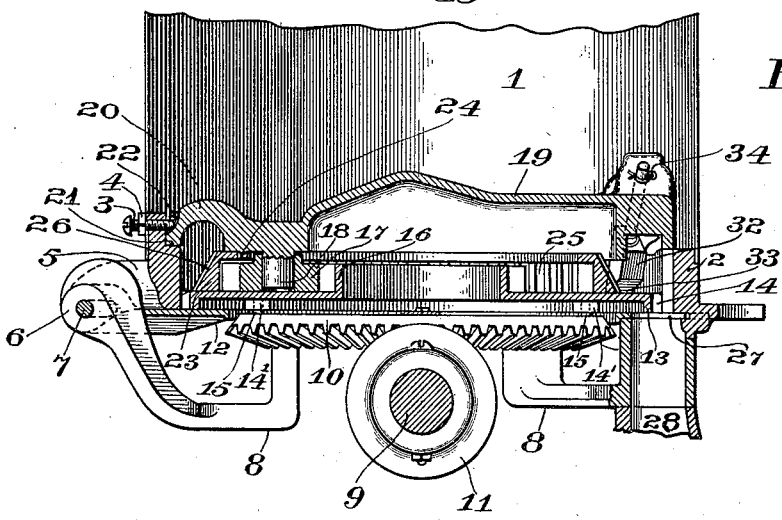

Figure 1 is a top plan view of a hopper having my improved seed dropping mechanism forming a part thereof; Fig. 2 is a sectional side elevation of Fig. 1, taken on line A. B. Fig. 3 is a top plan view similar to Fig. 1 and having the gear covering plate and knock-out mechanism removed; Fig. 4 represents a side elevation of the gear covering plate and seed ring and is designed to illustrate the operation of the cut-out and knock-out mechanism; Fig. 5 represents a cross section of part of Fig. 1, taken on line C. D. Fig. 6 is a fragmentary detail of part of a seed ring and its opposing wall and showing an opening for the delivery of corn to the seed conduit; Fig. 7 represents a fragmentary part of Fig. 1, partly in section on line E. F, showing the position of the knock-out housing to other operative parts of the mechanism; Fig. 8 is a detached detail, partly in section, of the cut-out and knock-out mechanism, as shown in Fig. 4; and Fig. 9 is a cross section of Fig. 5, on line G. H. on an enlarged scale showing the construction and manner of mounting the cut-out and knock-out plungers.

The same reference characters designate the same parts throughout the several views.

1 represents a cylindrical hopper body, preferably made of sheet metal and having its lower end secured to an annular ring member 2 by means of radially arranged screws 3 and lock nuts 4. The ring is provided upon one side thereof with outwardly projecting hinge members 5 that are pivotally connected with upwardly turned hinge members 6 by means of a hinge pin 7, the members 6 forming part of a seed hopper support 8, in which is journaled an operating shaft 9 that may be given rotary movement by any preferred means.

10 represents a bevel gear wheel journaled upon a support carried by the part 8 and to which motion is transmitted by means of a pinion 11 secured to the operating shaft.

12 represents an annular ring pivotally connected at one side with the hinge member 6 coaxially with the ring 2, and having its opposite end releasably connected with the ring 2.

13 represents a seed plate having seed receiving cells 14 upon its periphery that are adapted to receive the kernels of corn on edge in a well-known way, and $14^1$ represents ribs upon its lower surface that engage with pins 15 upon the gear wheel 10, whereby rotary movement is transmitted to the seed plate.

16 represents a spur pinion integral with the seed plate that engages with an intermediate pinion 17 journaled upon a depending stud 18 secured to a covering plate 19, having radially arranged arms 20 that project beyond the periphery of the plate and rest upon the shoulder portion 21 formed upon ring 2, the screw 3 engaging with angular surface 22 upon the ends of the arms in a manner to secure the cover in place.

23 represents an agitator ring rotatably mounted upon the seed plate and controlled by a depending annular rib 24 forming part of the covering plate and arranged eccentric to the axis of the seed plate, the agitator ring being provided with internal gear teeth 25 upon its inner surface that engage with the teeth of pinion 17 whereby rotary movement is transmitted to the agitator in a reverse direction relative to the seed plate. The periphery of the agitator is inclined downward and outward toward the seed plate and has its surface roughened or corrugated by means of spaced depressions 26 that are inclined rearward and upward in the direction of rotation of the agitator for the purpose of producing more aggressive action thereof when in operative contact with the mass of corn resting thereon. The annular ring 12 is provided with a seed opening 27 communicating with a seed conduit 28, and 29 represents a knock-out device slidably mounted in the covering plate, including a spring-pressed plunger inclined upward in the direction of rotation of the seed plate, having an angular portion received by a socket in the covering plate and a toe portion 30 at its lower end adapted to nearly engage with the division wall separating the seed cells and operative to push any kernels not received by the cells inward upon the flat surface of the plate to be carried thereby past the feed opening, and 31 represents a heel portion forming a part of the knock-out and operative to engage with the kernels of corn occupying the seed cells in a manner to eject them therefrom as they pass across the feed opening.

32 represents a cut-out device similar in form to the knock-out, and including a spring-pressed plunger, also slidably mounted in the covering plate in advance of the knock-out and inclined in the same direction and provided with a toe portion 33 that is adapted to contact with the kernels of corn not received by the cells in a manner to push them away from the cells and prevent them from being carried over the seed opening, both plungers being provided with pins 34 at their upper ends that limit their movement in a direction toward the seed ring.

I am aware that it is not new to provide a feeder ring rotatable with the seed plate, arranged eccentric thereto and operative to push the kernels toward the seed cells upon the side of the seed plate opposite to the discharge opening, the feeder being rotated in the same direction as the seed plate, and in other structures the feeder has been given a reciprocatory movement and in a measure operated as an agitator; while in my invention the agitator rotates in a reverse direction and does not operate to push the corn toward the cells for the reason that its periphery is moving away from the cells upon that side of the plate that is carrying the corn toward the narrow portion of the seed receiving channel between the agitator ring and the inner surface of the annular ring member 2 in a diametrical line passing through the axis of rotation of the seed plate and opposite the discharge opening and rotating in an opposite direction to the seed plate. Its primary function is to continually agitate the corn in the channel and prevent any choking or bridging thereof during the operation of the machine.

What I claim as my invention, and desire to secure by Letters Patent, is:

1. A corn planter including, in combination, a rotatable seed plate having seed receiving cells therein, means for rotating said seed plate, an agitator ring rotatably mounted above said seed plate, and means actuated by said seed plate and operative to rotate said agitator in a reverse direction relative thereto.

2. A corn planter including, in combination, a rotatable seed plate having seed receiving cells therein, means for rotating said seed plate, an agitator ring rotatably mounted above said seed plate and eccentric to the axis thereof, and means actuated by said seed plate and operative to rotate said agitator in a reverse direction relative thereto.

3. A corn planter including, in combination, a rotatable seed plate having seed receiving cells therein and a spur pinion forming an integral part thereof, an agitator ring rotatably mounted above said seed plate and provided with internal gear teeth, an intermediate pinion journaled upon a relatively fixed stud and engaging with said first mentioned pinion and with said ring in a manner to rotate said ring in a reverse direction relative to said seed plate.

4. A corn planter including, in combination, a seed hopper, a rotatable seed plate mounted in the bottom of said hopper and having seed receiving cells therein, a spur pinion forming an integral part thereof, an agitator ring rotatably mounted above said seed plate and provided with internal gear teeth, a covering plate secured in said seed hopper above said ring and said seed plate, an intermediate pinion journaled upon a depending stud secured to said covering plate and engaging with said first named pinion and with said agitator ring in a manner whereby said ring is rotated in a reverse direction relative to said seed plate.

5. A corn planter including, in combination, a seed hopper, a rotatable seed plate mounted in the bottom of said hopper and having seed receiving cells therein, a spur pinion forming an integral part thereof, a covering plate secured to said hopper above said seed plate and provided with a depending annular flange arranged eccentric to the axis of said seed plate, a rotatable agitator ring controlled by said flange and having internal gear teeth, an intermediate pinion journaled upon said covering plate and engaging with said internal gear teeth and said first named pinion whereby said agitator ring is rotated in a reverse direction relative to said seed plate.

SAMUEL K. DENNIS.

Witnesses:
 JAMES A. MOXEY,
 EVAN EVANS.

Copies of this patent may be obtained for five cents each, by addressing the "Commissioner of Patents, Washington, D. C."